E. D. EKSTEDT.
JOURNAL BEARING.
APPLICATION FILED DEC. 9, 1907.
1,054,189.
Patented Feb. 25, 1913.
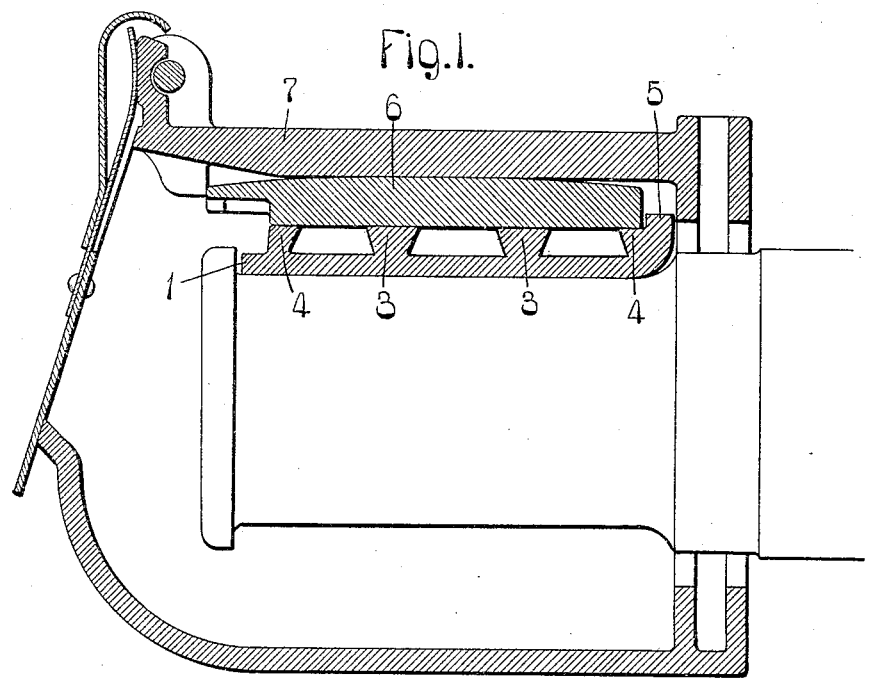
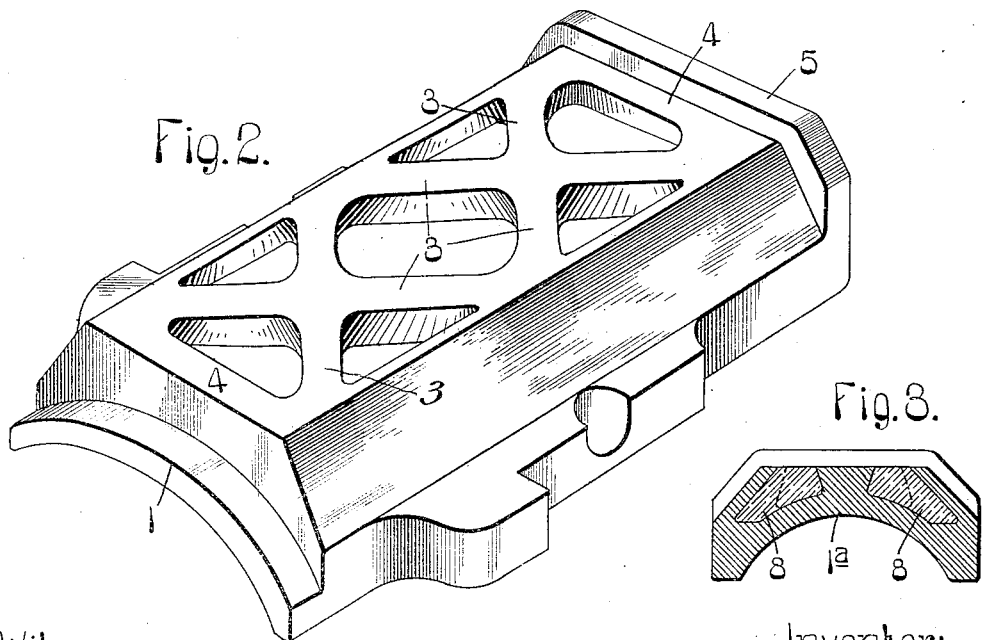
Witnesses
A. J. McCauley
Wells L. Church
Inventor:
Ernest D. Ekstedt
by Bakewell & Cornwall
Att'ys.

UNITED STATES PATENT OFFICE.

ERNEST D. EKSTEDT, OF EAST ST. LOUIS, ILLINOIS, ASSIGNOR OF ONE-THIRD TO CHARLES S. SHALLENBERGER AND ONE-THIRD TO THEODORE W. REMMERS, BOTH OF ST. LOUIS, MISSOURI.

JOURNAL-BEARING.

1,054,189.   Specification of Letters Patent.   Patented Feb. 25, 1913.

Application filed December 9, 1907. Serial No. 405,806.

*To all whom it may concern:*

Be it known that I, ERNEST D. EKSTEDT, a citizen of the United States, residing at East St. Louis, Illinois, have invented a certain new and useful Improvement in Journal-Bearings, of which the following is a full, clear, and exact description, such as will enable others skilled in the art to which it appertains to make and use the same, reference being had to the accompanying drawings, forming part of this specification, in which—

Figure 1 is a longitudinal sectional view of a journal box showing my improved journal bearing in operative position; Fig. 2 is a perspective view of my improved journal bearing; and Fig. 3 is a cross sectional view of one end of the improved journal bearing.

This invention relates to journal bearings for railway car trucks, and particularly to that type which have their upper faces cut away or recessed to produce a ribbed instead of a solid bearing surface, thereby reducing the weight of the bearing and also the cost of manufacturing same.

The main object of my invention is to provide a journal bearing of the type above referred to that is provided on its upper face with ribs which are so arranged that great strength is imparted to the body portion of the bearing and a more extended bearing surface is provided for the locking wedge than in the journal bearings of this type heretofore in use.

Another object of my invention is to provide a journal bearing comprising a body portion provided on its upper side with recesses or pockets and formed of bronze or equivalent metal and an inexpensive alloy filling said recesses or pockets.

I have herein shown my invention as embodied in a journal bearing that conforms in shape to the requirements of the Master Car-Builders' Association, and referring to the drawings which illustrate the preferred form of my invention, 1 designates the body portion of the bearing which is provided with a curved or concaved lower face. The body portion 1 is formed of bronze or an equivalent metal, and on the upper side thereof is a plurality of integral oppositely inclined diagonal ribs 3 that intersect each other and form practically two oppositely disposed V-shaped members that have their terminals connected to transversely extending ribs 4 located adjacent the ends of the body portion 1. At the inner end of the bearing is the usual flange 5 which coöperates with the locking wedge 6 that is arranged between the upper face of the bearing and the journal box 7. By providing the journal bearing with diagonal ribs 3 of this form which extend from end to end of the bearing, great strength is imparted to the body portion and an extended bearing surface is provided for the locking wedge, the upper sides and end portions of the ribs being shaped to conform to the bearing face of the locking wedge. Said diagonal ribs 3 also form trusses which resist the lateral strains that the inclined faces of the wedge exert on the bearing 1 and thus prevent said bearing from collapsing. The intersecting ribs 3, the transverse ribs 4, and the sides of the bearing form in the top of the bearing a plurality of closed pockets or recesses which are filled with an inexpensive alloy 8, the walls of said pockets being undercut to retain the alloy in place. The filling in the pockets is flush with the top of the ribs so as to coöperate with the ribs to form the top face of the bearing. This construction enables the production of a journal bearing of uniform cross section throughout its entire length that can be manufactured at a lower cost than a journal bearing of uniform cross section which is formed entirely of bronze or other equivalent material.

Having thus described my invention, what I claim as new and desire to secure by Letters Patent is:

As a new article of manufacture, a journal bearing comprising a body portion formed of bronze or an equivalent metal and provided on its upper side with a plurality of intersecting ribs forming pockets having undercut walls, and an inexpensive alloy filling said pockets and coöperating with the ribs between said pockets to form the top face of the bearing; substantially as described.

In testimony whereof I hereunto affix my signature in the presence of two witnesses, this sixth day of December 1907.

ERNEST D. EKSTEDT.

Witnesses:
F. R. CORNWALL,
GEORGE BAKEWELL.

Copies of this patent may be obtained for five cents each, by addressing the "Commissioner of Patents, Washington, D. C."